United States Patent [19]

Kessel et al.

[11] Patent Number: 4,688,612

[45] Date of Patent: Aug. 25, 1987

[54] MACHINE FOR CUTTING AND FINISHING CURVED WOODEN MEMBERS WITH CUT-OFF AND ROUTING ATTACHMENTS

[75] Inventors: Michael Kessel, Milford; Erwin Kessel, Flemington; Eugene Schneider, White House Station, all of N.J.

[73] Assignee: Daniel Winters, East Hanover, N.J.

[21] Appl. No.: 890,108

[22] Filed: Jul. 28, 1986

[51] Int. Cl.$^4$ ............................................... B27C 9/00
[52] U.S. Cl. ................................... 144/3 R; 83/486.1; 144/256.2; 144/259; 144/363; 144/371; 144/367
[58] Field of Search .......... 144/1 R, 2 R, 3 R, 256 R, 144/256.1, 256.2, 259, 367, 371, 363, 134 R, 136 R; 83/486.1, 486 R, 802

[56] References Cited

U.S. PATENT DOCUMENTS

| | | | |
|---|---|---|---|
| 927,975 | 7/1909 | Kaufman et al. | 144/256.1 |
| 1,862,414 | 6/1932 | McAlister | 144/259 |
| 2,799,307 | 7/1957 | Nickol | 144/256.2 |
| 4,353,399 | 10/1982 | Harris | 83/802 |

Primary Examiner—W. D. Bray
Attorney, Agent, or Firm—Daniel H. Bobis

[57] ABSTRACT

A machine for precision cutting and finishing of curved wooden members, includes a generally vertically disposed column; a support assembly including a plurality of spaced, relatively narrow support guides; a radially adjustable clamping assembly on each of at least two support guides, each clamping assembly having two locking jaws, at least one locking jaw being fluidly operated to move relative to the other locking jaw and for holding and fixing the curved wooden member; an elongated beam rotatably connected at one end to the upper end of the column and cantilevered to extend radially outward therefrom for movement in a circumferential arc over the upper support members, a tool support having one end slidably connected to the elongated cantilevered beam and movable to and fro along the radially extending axis of the beam; a tool holder adjustably connected on the tool support for generally vertical and rotational movement, the tool holder including a T-connector having opposite tool connecting ends and two tool holding rods removably secured in the connecting ends, a cutting saw attachment having a cutting blade mounted on at least one of the tool holding rods; a rack and pinion assembly for moving the tool holder along a vertical axis with respect to the tool support; and a counterbalance weight system connected to the rack and pinion assembly so as to maintain the tool holder at any desired position with respect to the tool support.

18 Claims, 20 Drawing Figures

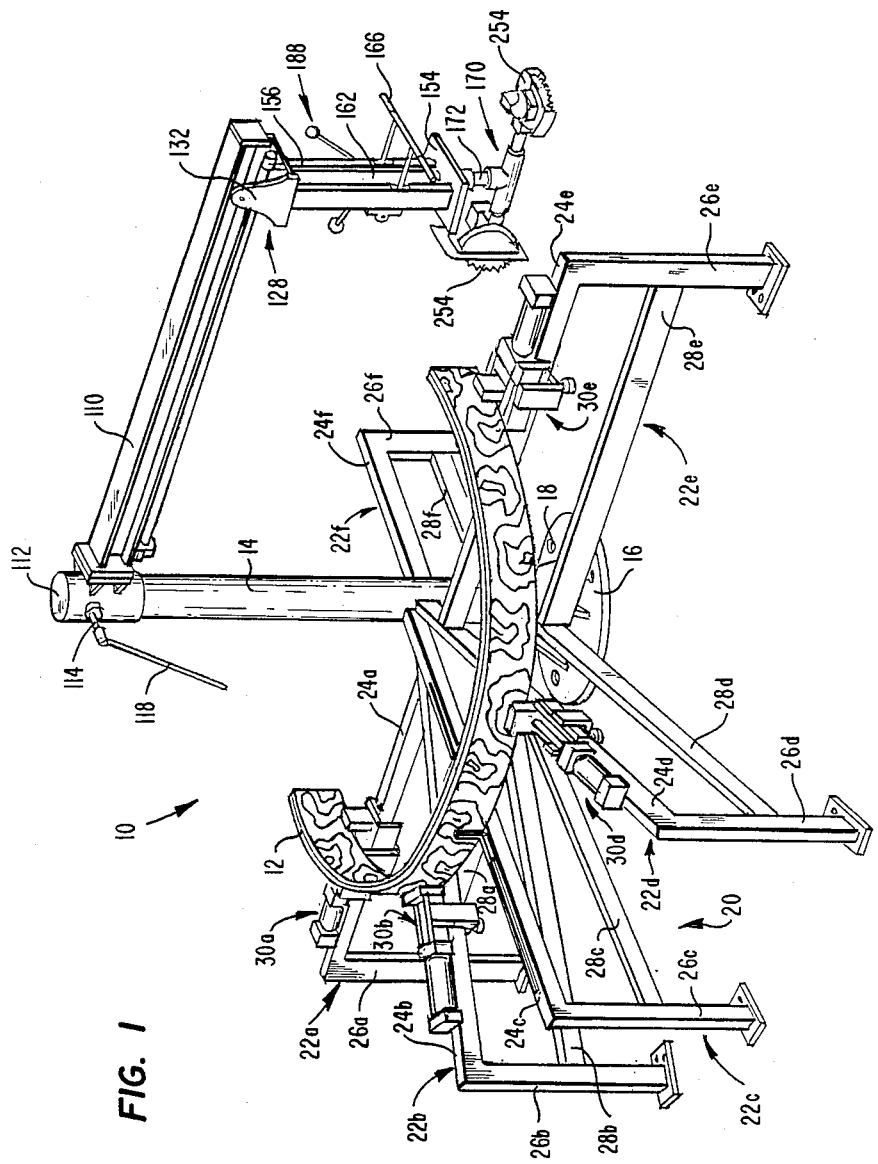

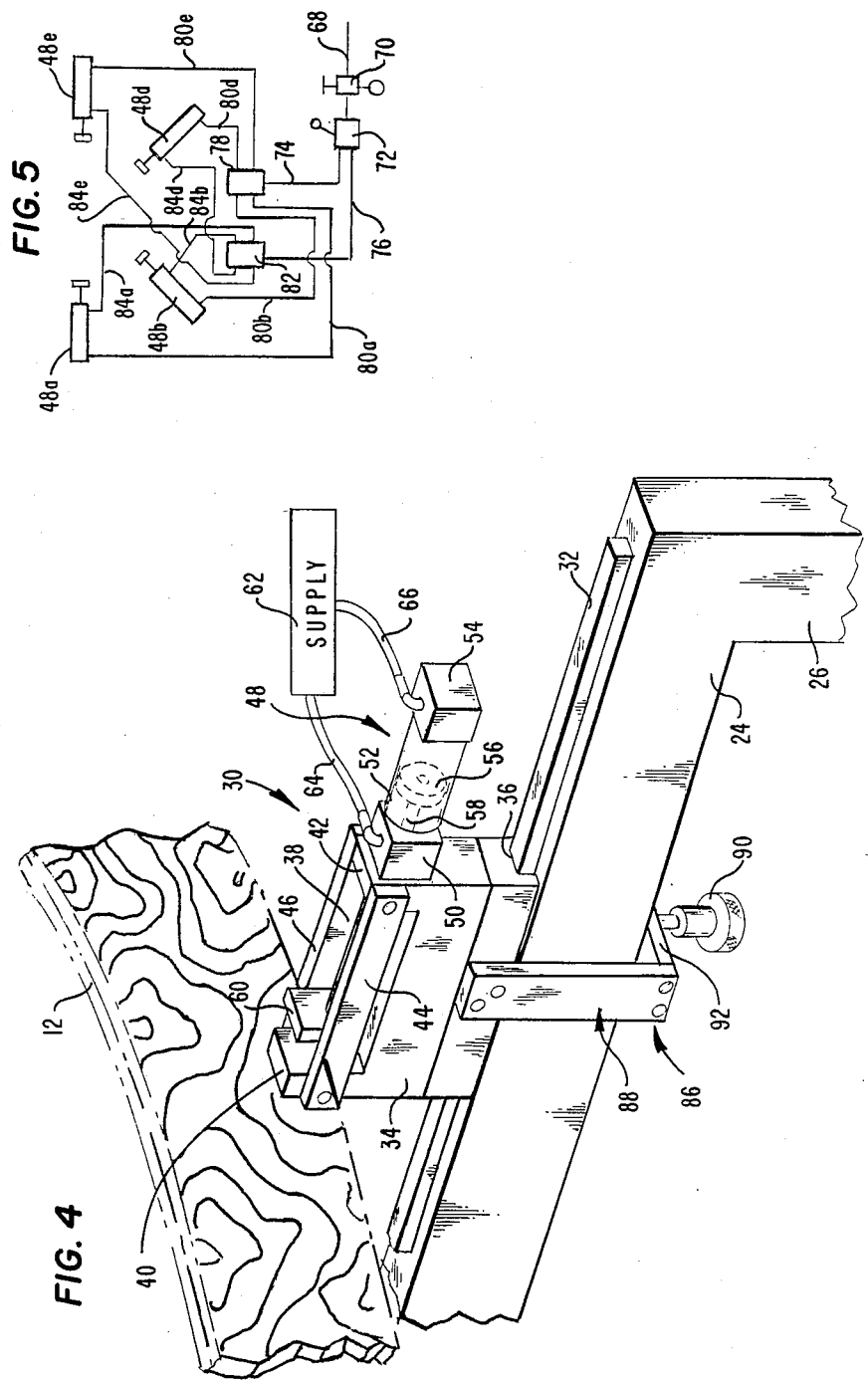

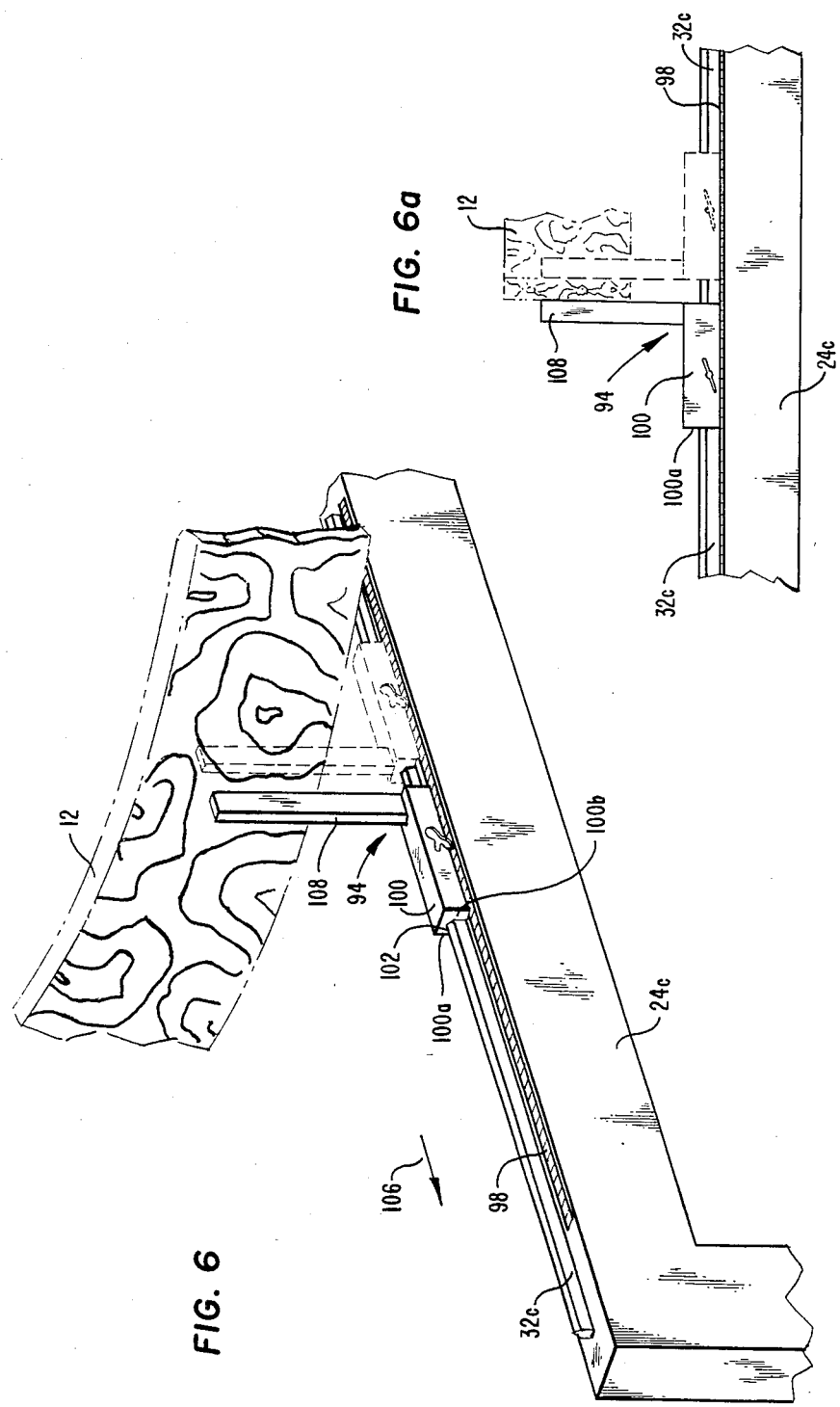

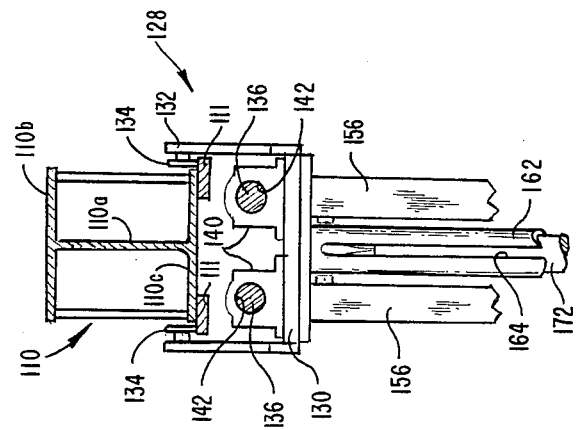
FIG. 11
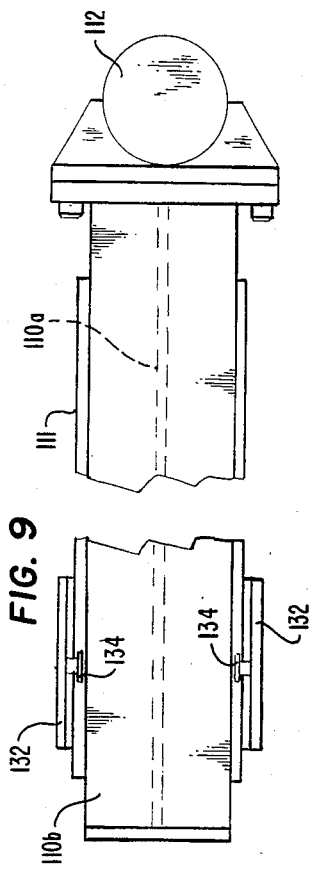
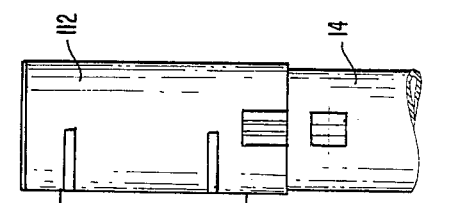
FIG. 10
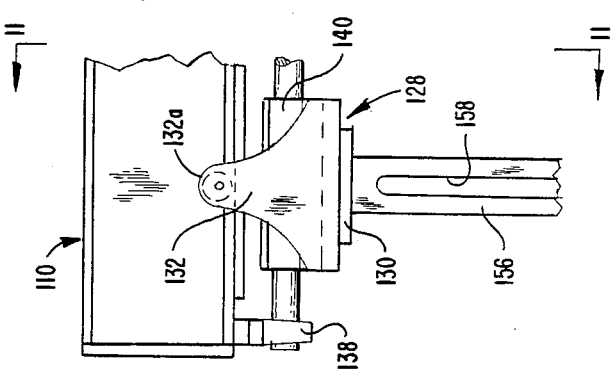
FIG. 9

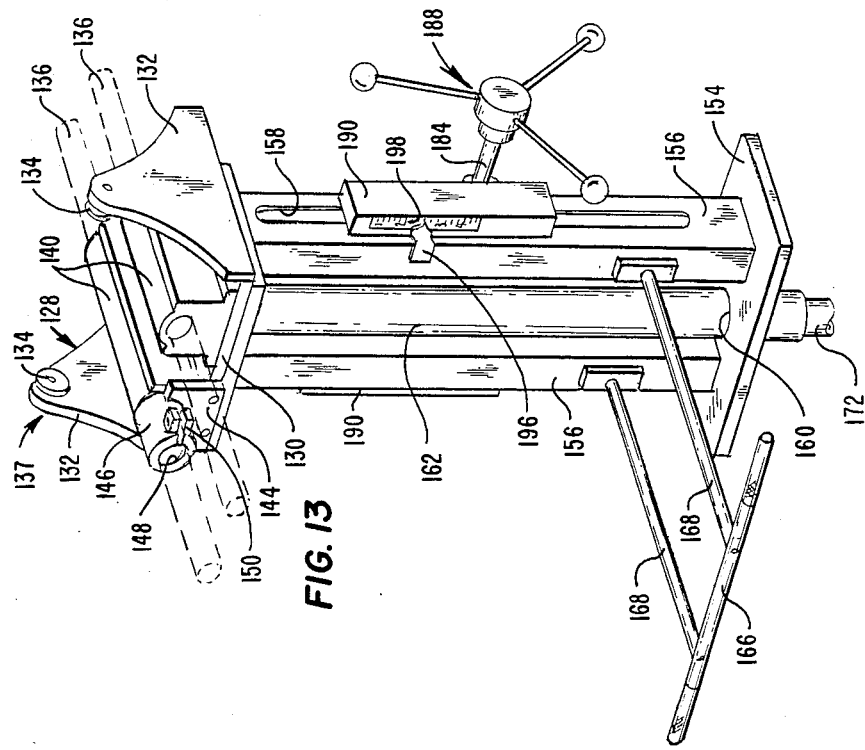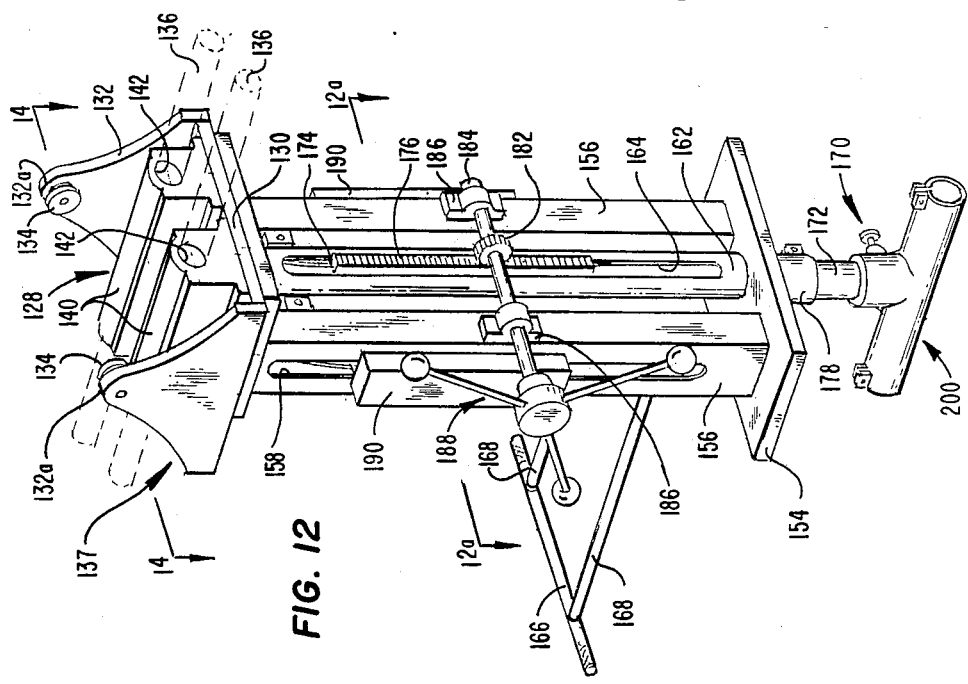

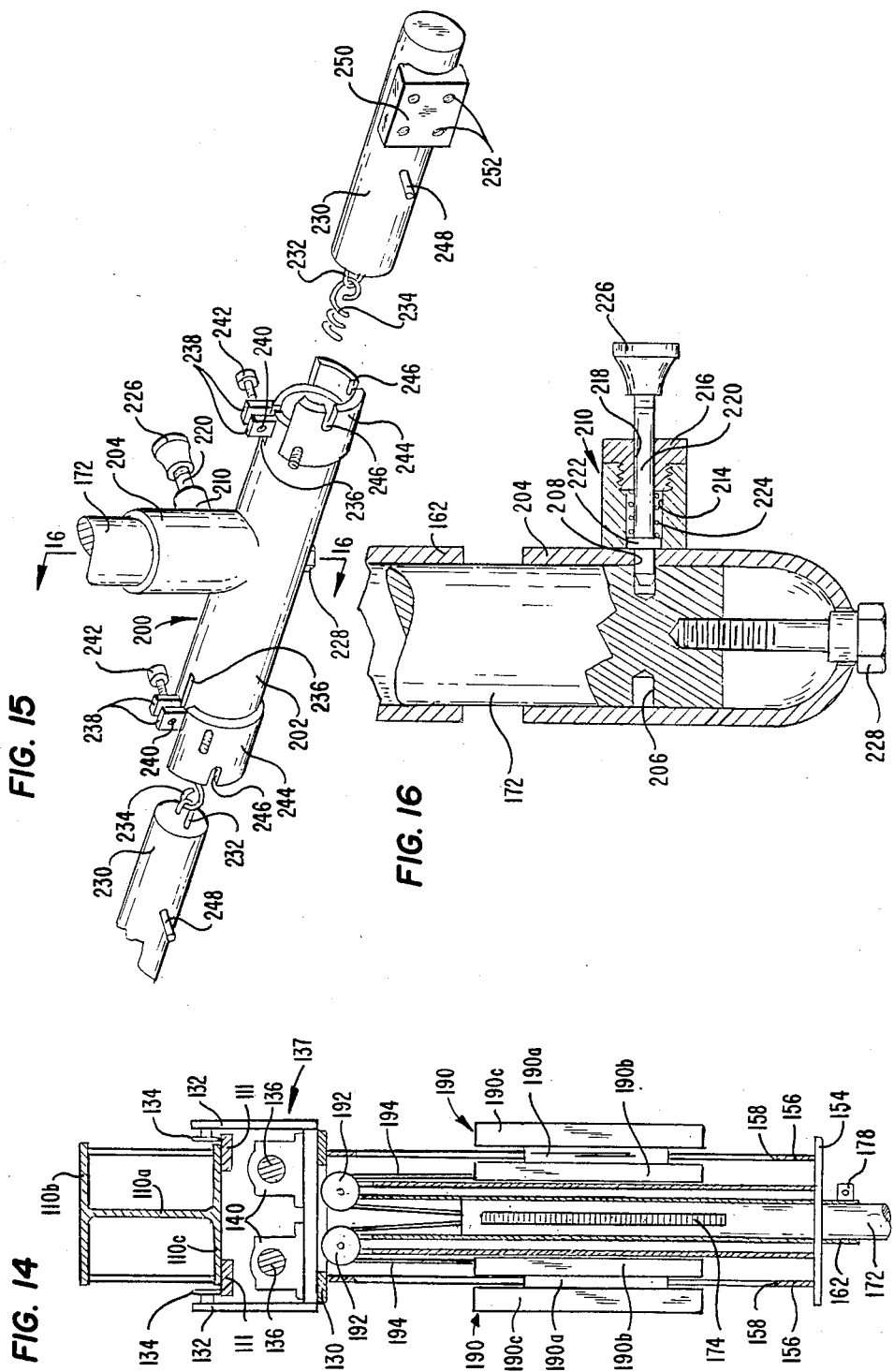

MACHINE FOR CUTTING AND FINISHING CURVED WOODEN MEMBERS WITH CUT-OFF AND ROUTING ATTACHMENTS

BACKGROUND OF THE INVENTION

This invention relates generally to precision cutting machinery and, more particularly, to a machine for the precision cutting of curved wooden members having coacting accessories for routing and cutting of the curved wooden members at the precise dimensions required for devices such as windows, doors, arched frames and the like used in the construction of residential, industrial, commercial and other types of buildings.

In the co-pending Application entitled Curved Wood Bending Machine, filed Mar. 5, 1986 under U.S. Pat. Ser. No. 836,476, apparatus is shown and disclosed for the arcuate bending of solid, veneered and laminated elongated wooden members. Those skilled in the art will recognize that when such wooden members are formed into arcuate and curved shapes, they must be processed further to prepare them for finishing and incorporation into windows and doors for construction purposes, for use as arcuate ribs, on boats, sounding board frames or pianos and for other residential, commercial and industrial applications and uses.

Various hand tools and hand machines are known for cutting and grooving such curved members. However, where the commercial production of, for example, the windows and doors are undertaken, it is necessary to provide precision machinery to produce the windows and doors to the uniform standard required in residential, commercial and industrial buildings such as the sizing of such windows and doors to enable them to fit into predetermined sized openings set up during the framing of the given building.

OBJECTS AND SUMMARY OF THE INVENTION

The present invention provides a machine for accomplishing this purpose in which the curved wooden member is placed and clamped on a supporting assembly which is disposed and connected to a vertical support column on which a cantilevered beam is rotatably movable over the supporting assembly and the curved wooden member thereon. A tool support is slidably connected on the cantilevered beam, and a tool holder is mounted to the tool support for vertical movement with respect thereto. Cutting and/or finishing tools are mounted on the tool support and can be brought into cutting engagement for vertical and horizontal finishing of the sides and ends of the curved wooden member. The tool holder has dual heads so that various cutting and/or routing tools can be connected to the tool holder and used alternatively and selectively as required in the cutting and finishing of the curved wooden member.

In accordance with an aspect of the present invention, a machine for precision cutting and finishing of curved wooden members, includes a generally vertically disposed column; a support assembly including a plurality of spaced, relatively narrow support guides, each connected at one end to the column and disposed to extend therefrom in predetermined radial planes generally perpendicular to the column, the plurality of support guides each having an upper support member disposed at a predetermined working height for mounting a curved wooden member thereon; a radially adjustable clamping assembly on each of at least two support guides, each clamping assembly having two locking jaws, at least one locking jaw being fluidly operated to move relative to the other locking jaw between an open and a closed position for holding and fixing the curved wooden member on each of the upper support members of the plurality of support guides; an elongated beam rotatably connected at one end to the upper end of the column and cantilevered to extend radially outward therefrom for movement in a circumferential arc over the upper support members; a tool support having one end slidably connected to the elongated cantilevered beam and movable to and fro along the radially extending axis of the beam; and a tool holder adjustably connected on the tool support for generally vertical movement along a vertical axis transverse to the radially extending axis of the elongated beam and rotational movement with respect to the vertical axis, and the tool holder including at least two tool connecting ends and at least two tool holding assemblies removably secured at respective ones of the connecting ends, each tool holding assembly including mounting means for mounting a cutting and/or finishing tool thereon, with a cutting saw attachment having a cutting blade mounted on at least one of the tool holding assemblies, whereby on movement of the tool holder, the saw blade can be positioned to make a finished cut along one exposed end of the curved wooden member in assembled position on the upper support members.

In accordance with another aspect of the present invention, a machine for precision cutting and finishing of curved wooden members, includes a generally vertically disposed column; a support assembly including a plurality of spaced, relatively narrow support guides, each connected at one end to the column and disposed to extend therefrom in predetermined radial planes generally perpendicular to the column, the plurality of support guides each having an upper support member disposed at a predetermined working height for mounting a curved wooden member thereon; a radially adjustable clamping assembly on each of at least two support guides, each clamping assembly having two locking jaws, at least one locking jaw being fluidly operated to move relative to the other locking jaw between an open and a closed position for holding and fixing the curved wooden member on each of the upper support members of the plurality of support guides; an elongated beam rotatably connected at one end to the upper end of the column and cantilevered to extend radially outward therefrom for movement in a circumferential arc over the upper support members; a tool support having one end slidably connected to the elongated cantilevered beam and movable to and fro along the radially extending axis of the beam; a tool holder adjustably connected on the tool support for generally vertical movement along a vertical axis transverse to the radially extending axis of the elongated beam and rotational movement with respect to the vertical axis, and the tool holder having at least two tool connecting ends thereon, and a cutting saw attachment with a cutting blade connected therein on at least one of the tool connecting ends, whereby on movement of the tool holder, the saw blade can be positioned to make a finished cut along one exposed end of the curved wooden member in assembled position on the upper support members; moving means for moving the tool holder along the vertical axis; and counterbalance means connected to the moving means for counterbalancing the weight of the tool holder and any tools mounted threon, so as to maintain the tool holder at any desired position with respect to the tool support.

In accordance with still another aspect of the present invention, a machine for precision cutting and finishing of curved wooden members, includes a generally vertically disposed column; a support assembly including a plurality of spaced, relatively narrow support guides, each connected at one end to the column and disposed to extend therefrom in predetermined radial planes generally perpendicular to the column, the plurality of support guides each having an upper support member disposed at a predetermined working height for mounting a curved wooden member thereon; a radially adjustable clamping assembly on each of at least two support guides, each clamping assembly having two locking jaws, at least one locking jaw being fluidly operated to move relative to the other locking jaw between an open and a closed position for holding and fixing the curved wooden member on each of the upper support members of the plurality of support guides; an elongated beam rotatably connected at one end to the upper end of the column and cantilevered to extend radially outward therefrom for movement in a circumferential arc over the upper support members, a tool support having one end slidably connected to the elongated cantilevered beam and movable to and fro along the radially extending axis of the beam; a tool holder adjustably connected on the tool support for generally vertical movement along a vertical axis transverse to the radially extending axis of the elongated beam and rotational movement with respect to the vertical axis, and the tool holder including at least two tool connecting ends and at least two holding assemblies removably secured at respective ones of the connecting ends, each tool holding assembly including mounting means for mounting a cutting and/or finishing tool thereon, with a cutting saw attachment having a cutting blade mounted on at least one of the tool holding assemblies, whereby on movement of the tool holder, the saw blade can be positioned to make a finished cut along one exposed end of the curved wooden member in assembled position on the upper support members; moving means for moving the tool holder along the vertical axis; and counterbalance means connected to the moving means for counterbalancing the weight of the tool holder and any tools mounted thereon, so as to maintain the tool holder at any desired position with respect to the tool support.

With these and other objects in view the invention will be better understood by reference to the description and claims which follow, when taken in conjunction with the following drawings:

BRIEF DESCRIPTION OF THE DRAWINGS

FIG. 1 is a perspective view of a machine for cutting and finishing curved wooden members in accordance with the present invention, showing a curved wooden member in assembled position thereon;

FIG. 4 is a perspective view of a portion of one of the upper support members of the support guides of FIG. 1, showing a clamping assembly thereon in engagement with a fragment of a curved wooden member shown in phantom lines;

FIG. 5 is a diagrammatic sketch of the pneumatic system for operating the clamping assemblies on the support guides of FIG. 1;

FIG. 6 is a perspective view of a portion of an upper support member for a support guide of FIG. 1, with an adjustable stop member in operative association with a curved wooden member shown in phantom lines;

FIG. 6A is a side elevational view of the adjustable stop member and a portion of the upper support member of FIG. 6;

FIG. 9 is a top plan view of the cantilevered beam shown in FIG. 1;

FIG. 10 is a side elevational view of the cantilevered beam shown in FIG. 9;

FIG. 11 is a cross-sectional view of the cantilevered beam and tool support of FIG. 10, taken along line 11—11 of FIG. 10;

FIG. 12 is a perspective view, looking from the radial inward direction, of the tool support, showing the means for mounting the upper end of the tool support on the cantilevered beam;

FIG. 13 is a perspective view, looking from the radial outward direction, of the tool support shown in FIG. 12;

FIG. 14 1s a cross-sectional view of the tool support of FIG. 12, taken along line 14—14 of FIG. 12;

FIG. 15 is an exploded, perspective view of the tool holder of FIG. 1, connected to the lower end of the tool support, with the connecting means for the tools shown in exploded form;

FIG. 16 is a partial cross-sectional view of the tool holder of FIG. 15, taken along line 16—16 of FIG. 15, showing the lock-in and lock-out mechanism to prevent rotation of the tool holder and the cutting devices connected thereon during operation of the machine for cutting curved wooden members in accordance with the present invention;

DETAILED DESCRIPTION OF THE INVENTION

Figure 3:
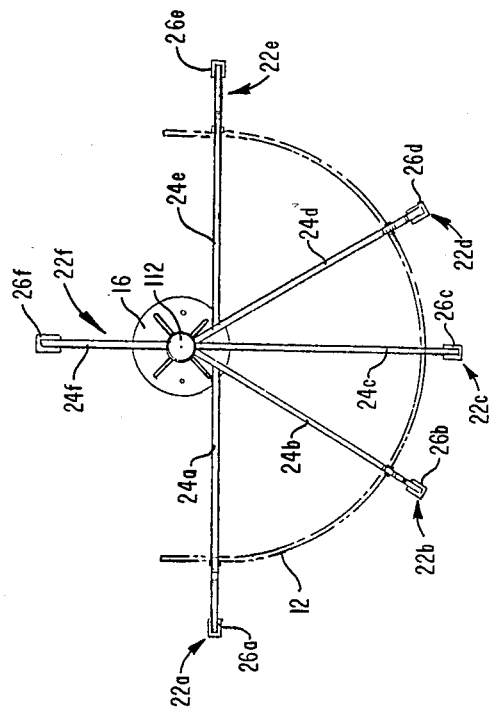
FIG. 3 is a diagrammatic top plan view of the machine of FIG. 1, with a curved wooden member shown in phantom lines.
Figure 2:
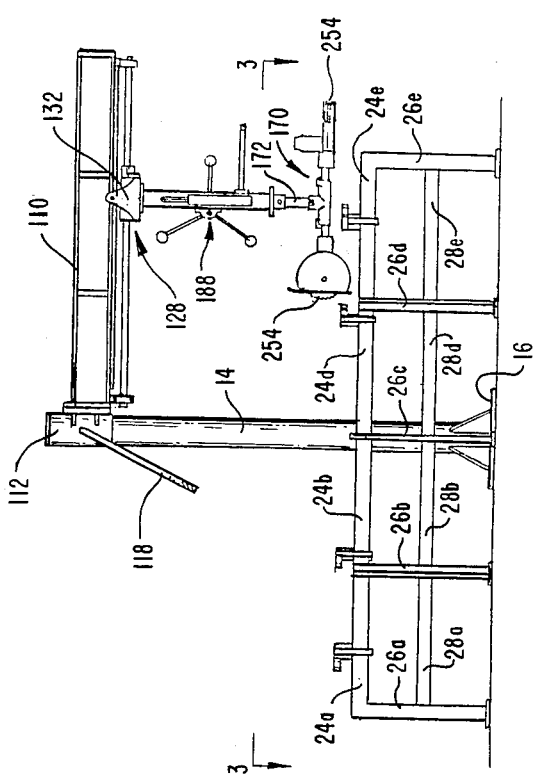
FIG. 2 is a side elevational view of the machine of FIG. 1.

Referring to the drawings in detail, and initially to FIG. 1 thereof, a machine 10 for cutting a curved wooden member 12, according to the present invention, includes a cylindrical column 14 which is vertically positioned by means of a flat circular plate 16 secured to the lower end thereof and which sits upon a flat surface, such as the floor of a building. Flat circular plate 16 is provided with a plurality of apertures 18 through which suitable bolts (not shown) can be inserted for securing flat circular plate 16 to the floor of the building.

A support assembly 20 is connected to vertically disposed column 14 and generally includes a plurality of circumferentially spaced support guides 22a, 22b, 22c, 22d, 22e and 22f. As shown, support guides 22b, 22c, 22d and 22f are connected to column 14 and extend radially outward therefrom along predetermined radial planes generally perpendicular to column 14. Support guides 22a and 22e, on the other hand, are positioned diametrically opposite to each other, and are each connected at one end to a respective support guide 22b and 22d at a position close to column 14. This latter connection is made in order to reduce the overall length of curved wooden member 12. Specifically, if support guides 22a and 22e were connected in radial planes extending from column 14, the overall length of curved wooden member 12 would have to be lengthened in order to clamp the ends thereof. This has proven to be a waste of material. Therefore, support guides 22a and 22e are connected to support guides 22b and 22d, respectively, to shorten the length necessary for clamping curved wooden member 12. However, the present invention is not so limited. Support guides 22a–22e are therefore generally spaced about a semi-circular arc, since curved wooden member 12 assumes a generally semi-circular configuration, with support guide 22f being disposed substantially diametrically opposite from center support guide 22c.

It will be appreciated that the number and spacing of the support guides 22 can be varied in accordance with the teachings of the present invention.

Each support guide 22a–22f includes an upper support rail member 24a–24f, respectively, each extending in the radial plane of the respective support guide 22a–22f. The upper surfaces of rail members 24a–24e are co-planar so as to provide a support surface for curved wooden member 12. Since support guide 22f merely functions to stabilize machine 10, the upper surface of rail member 24f need not be co-planar with the upper surfaces of rail members 24a–24e.

Each support guide 22a–22f further includes a vertical support member 26a–26f, respectively, having its lower end supported on the floor of the building and its upper end connected with the radially outermost end of the respective upper support rail member 24a–24f. In this regard, upper support rail members 24b–24d and 24f are connected at opposite ends between column 14 and the respective vertical support member 26b–26d and 26f, while upper support rail members 24a and 24e are connected between upper support rail members 24b and 24d, respectively, and vertical support members 26a and 26e, respectively.

In order to provide further stability, support assembly 20 includes lower support rail members 28a–28f. Specifically, lower support rail members 28b–28d and 28f are connected between column 14 and vertical support members 26b–26d and 26f, respectively, at positions vertically below and parallel with the respective upper support rail members 24b–24d and 24f. In a similar manner, lower support rail members 28a and 28e are connected between lower support rail members 28b and 28d, respectively, and vertical support members 26a and 26e, respectively, at positions vertically below and parallel with upper support rail members 24a and 24e.

With the arrangement thus far described, the upper surfaces of upper support rail members 24a–24e provide a support surface for different curved wooden members 12 having different radii.

Clamping assemblies 30a, 30b, 30d, and 30e are each slidably and movably mounted in the radial direction along upper support members 24a, 24b, 24d, and 24e, respectively for holding and fixing a curved wooden member 12 on upper support rail members 24a–24e. Upper support rail members 24a–24e, vertical support members 26a–26e and clamping assemblies 30a, 30b, 30d, and 30e are all identical, and accordingly, for ease of description, a single clamping assembly will be described with respect to FIG. 4, and will be referenced by numeral 30, with the respective upper support rail member being referenced by numeral 24 and vertical support member by numeral 26.

As shown in FIG. 4, a guide rail 32 is secured to the upper surface of upper support rail member 24 for slidably guiding clamping assembly 30 therealong. Clamping assembly 30 includes a slidable frame 34 having a channel 6 centrally positioned along the entire lower surface thereof and through which guide rail 32 extends, whereby frame 34 is slidably guided along guide rail 32. The upper surface of slidable frame 34 is also cut-out to define a recess 38 substantially perpendicular to inverted channel 36. Recess 38 is defined by a radially inward wall 40 which functions as a stationary clamping jaw and a radially outward wall 42. The sides adjacent recess 38 are closed by strips 44 and 46, respectively, connected between radially inner wall 40 and radially outer wall 42 and on opposite sides thereof. The upper surfaces of closing strips 44 and 46 are generally co-planar so that curved wooden member 12 is actually supported on such upper surfaces.

A pneumatic assembly 48, which is conventional, is secured to radially outer wall 42. Specifically, pneumatic assembly 48 includes a first header 50 secured to radially outer wall 42, a cylinder 52 connected to first header 50 and a second header 54 connected to the opposite end of cylinder 52. A piston 56 is slidably movable within cylinder 52 and provides a sealing arrangement with the inner wall of cylinder 52. A piston rod 58 extends from piston 56, and extends through cylinder 52, first header 50 and radially outer wall 42 into recess 38 and has a movable jaw 60 secured to the opposite end thereof. A supply of air 62 is connected to first and second headers 50 and 54 by means of supply lines 64 and 66, respectively. In this manner, when air is supplied along supply line 66 to second header 54, piston 56, and thereby piston rod 58 and movable jaw 60, are moved radially inward toward stationary jaw 40. During such movement, the air on the opposite side of piston 56 is forced through header 50 into supply line 64 and back to supply 62. On the other hand, when air is supplied from supply 62 to supply line 64, piston 56 is forced radially outward and air on the opposite side is forced through header 54 into supply line 66 and back to supply 62. In this manner, curved wooden member 12 can be positioned and tightened between jaws 40 and 60.

As shown in FIG. 5, there are four pneumatic assemblies 48a, 48b, 48d and 48e, which form part of clamping assemblies 30a, 30b, 30d and 30e, respectively, shown in FIG. 1. As shown, a main supply line 68, which is supplied with air under pressure, is connected to an ON/OFF valve 70 which functions to either supply the air under pressure therethrough or block the same. The output 10. of ON/OFF valve 70 is connected to a two-way switch 72 which supplies the pressurized air to either a main clamping line 74 or a main release line 76. Main clamping line 74 is connected to a first selector valve 78 having four output lines 80a, 80b, 80d and 80e connected to the second header 54 of one of more pneumatic assemblies 48a, 48b, 48d and 48e, respectively. Selector valve 78 supplies pressurized air from main clamping line 74 to one or more of pneumatic assemblies 48a, 48b, 48d and 48e. In like manner, main release line 76 is connected to a second selector valve 82 which selectively supplies pressurized air to the first header 50 of one or more pneumatic assemblies 48a, 48b, 48d and 48e, through output lines 84a, 84b, 84d and 84e, respectively. Thus, for example, when it is desired to move jaw 60 of pneumatic assembly 48e radially inward, switch 72 supplies the pressurized air to main clamping line 74, and first selector valve 78 supplies the pressurized air along output line 80e to second header 54 of pneumatic assembly 48e.

Referring back to FIG. 4, it is seen, as previously discussed, that frame 34 of clamping assembly 30 is slidable along guide rail 32 on upper support rail member 24. In order to fix frame 34 at a desired position along guide rail 32, a tightening assembly 86 is provided. Specifically, tightening assembly 86 includes a U-shaped frame 88 which is secured at the free ends thereof to opposite sides of a lower portion of slidable frame 34, such that frame 88 surrounds the side and lower surfaces of upper support rail member 24 and is spaced therefrom. A tightening member 90, such as a bolt or the like, is screw-threadedly received within the bottom or connecting section 92 of U-shaped frame 88 so as to engage the lower surface of upper support rail member 24 to lock slidable frame 34 to upper support rail member 24 at a desired position.

Referring now to FIGS. 1 and 6, it is noted that no clamping assembly 30 is provided on upper support rail member 24c. Rather, in place of a clamping member 30, a restraining member 94 is positioned on the upper surface of upper support rail member 24c Specifically, the upper surface of upper support rail member 24c is formed with a guide rail 32c. Two rows 96 and 98 of teeth are formed on the upper surface of upper support rail member 24c on opposite sides of guide rail 32c.

Restraining member 94 is formed by a guide block 100 having a central, longitudinally oriented channel 102 at its lower surface, through which guide rail 32c extends. In other words, guide rail 32c fits within channel 102 such that guide block 100 is slidably supported on guide rail 32c. Because of the formation of channel 102, guide block 100 has a substantially inverted U-shaped configuration, as shown in FIG. 6, with opposite legs 100a and 100b thereof hanging down on opposite sides of guide rail 32c. The free ends of legs 100a and 100b are formed with teeth 104 which matingly engage with the teeth of rows 96 and 98, as shown in FIG. 6A. Thus, when it is attempted to move guide block 100 rearwardly, in the direction of arrow 106, teeth 104 engage the teeth of rows 96 and 98 to restrain movement of guide block 100, while permitting movement of guide block 100 in the opposite direction when a force in a direction in a direction opposite to arrow 106 is applied thereto. A stop member 108 extends upwardly from the forward end of guide block 100 for engaging the convex surface of curved wooden member 12, as shown in FIG. 6. In effect, stop member 08 functions as a further stabilization point for curved wooden member 12, without the necessity of an additional clamping assembly.

With the arrangement thus far described, a curved wooden member 12 can be securely held by clamping assemblies 30 and restraining member 94, regardless of the arc, radius or length of curved wooden member 12.

Referring back to FIG. 1, the portion of the apparatus used for cutting and routing curved wooden member 12 while the latter is supported on support assembly 20, will now be described.

Figure 8:
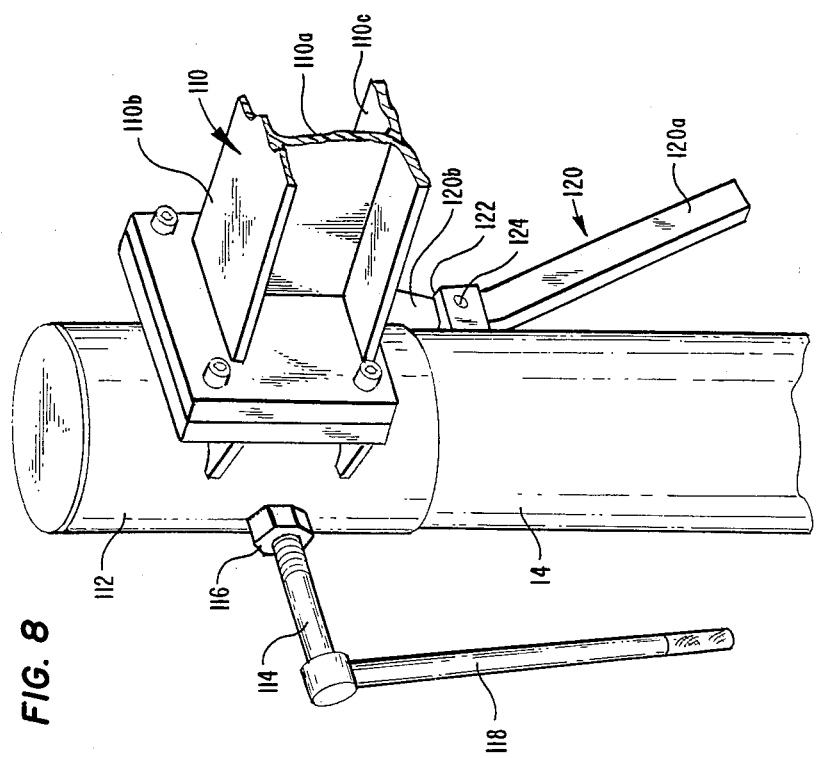
FIG. 8 is a perspective view of the upper end of the vertical column, as shown in FIG. 7, with a locking and release mechanism to permit the beam to rotate when the safety latch assembly is disengaged.
Figure 7:
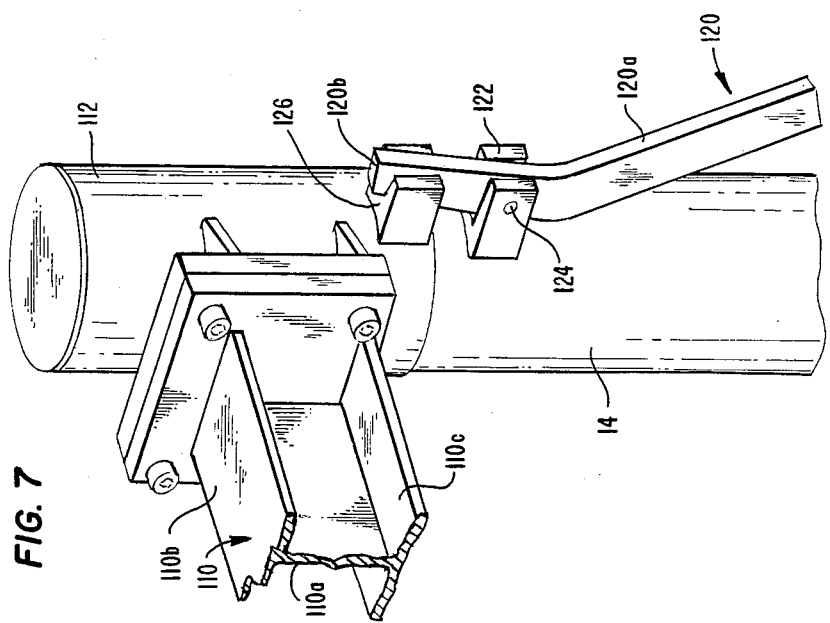
FIG. 7 is a perspective view of a portion of the vertical column and cantilevered beam of FIG. 1 rotatably attached thereto, together with a safety latch assembly to prevent the cantilevered beam from rotating when the machine is in a non-operating state.

Specifically, an elongated beam 110 is rotatably connected at one end thereof to the upper end of column 14. Although beam 110 is shown as an I-beam, the construction thereof is not limited to this configuration. As shown more particularly in FIGS. 7 and 8, I-beam 110 is fixedly connected to a cylindrical cap 112 which is received on the upper end of column 14 for rotatably supporting I-beam 110 on column 14. In order to rotatably fix I-beam 110 with respect to column 14, a bolt 114 is screw-threadedly received within a nut 116 secured to the outer surface of cap 112, and extends through a coaxial aperture (not shown) in cap 112 for engaging the outer surface of column 14. A handle 118 is secured to the opposite free end of bolt 114 for rotating bolt 114 with little force so as to engage or disengage bolt 114 from column 14. Thus, when bolt 114 is turned in a tightening manner, bolt 114 engages column 14 to rotatably lock I-beam 110 with respect to column 14. In this manner, I-beam 110 can be locked at any rotatable position with respect to column 14.

When not in use, it is desirable to absolutely prevent movement of I-beam 110 with respect to column 14. In this regard, a lever 120 is formed with a first elongated handle portion 120a and a second locking member portion 120b extending from handle portion 120a at an obtuse angle with respect thereto. Lever 120 is pivotally mounted to column 14. Specifically, a U-shaped pivot block 122 is secured to column 14 just below cap 112 for receiving lever 120 therein, and a pivot pin 124 extending through the legs of pivot block 122 pivotally secures lever 120 therein at a point adjacent to the connection of first elongated handle portion 120a and locking member portion 120b, such that locking member portion 120b extends upwardly toward cap 112 and first elongated handle portion 120a extends downwardly away from cap 112. A U-shaped latch 126 is mounted at the lower end of cap 112 for receiving locking member portion 120b therein when handle portion 120a is grasped and pulled away from column 14. In other words, when handle portion 120a is pulled away from column 14, lever 120 pivots about pivot pin 124 to rotate locking member portion 120b within latch 126. In this position, cylindrical cap 112, and thereby I-beam 110, are prevented from rotating with respect to column 14.

As is well known, an I-beam, such as I-beam 110, is provided with a central web 110a and first and second flanges 110b and 110c connected centrally at opposite ends of web 110a. For purposes of the present invention, web 110a is vertically oriented, with flange 110b constituting an upper flange and flange 110c constituting a lower flange.

As shown in FIGS. 9-13, a tool support 128 is slidably connected along cantilevered I-beam 110 and movable to and fro along the radially extending axis thereof. Specifically, tool support 128 includes a base platform 130, and two side supports 132 extending upwardly from opposite sides of base platform 130 and having a substantially triangular configuration, although side supports 132 are not limited to such configuration. A pair of rollers 134 are rotatably connected at the upper apices 132a of side supports 132 in inwardly opposing relation to each other. With the arrangement thus far described, side supports 132 extend on opposite sides of I-beam 110 such that rollers 134 ride upon roller supports 11 secured along the underside of lower flange 110c, as particularly shown in FIGS. 9–11.

In order to further guide tool support 128 along cantilevered I-beam 110, two parallel support rods 136 of a yoke assembly 137 are secured to lower flange 110c at positions therebelow, in parallel and spaced relation, by a pair of brackets 138 secured to and hanging down from lower flange 110c at opposite ends thereof, as shown in FIG. 10. Support rods 136 are positioned between side supports 132 and above base platform 130 when tool support 128 is movably mounted along roller supports 111. A pair of guide structures 140 are mounted on base platform 130 in spaced apart relation and extend in the lengthwise direction thereof. Each guide structure 140 includes a guide bore 142 extending entirely therethrough in the lengthwise direction and through which a respective guide rod 136 extends, whereby tool support 128 is guided along guide rods 136 and is rotatably supported along cantilevered I-beam 110.

As shown in FIG. 13, a mounting plate 144 can be secured to the end face of one guide structure 140, and supports a locking collar 146 thereat. Locking collar 146 includes a central bore 148 which is coaxial with the respective guide bore 142. Therefore, the respective guide rod 136 also extends through central bore 148 of locking collar 146. Locking collar 146 is a conventional collar which can be tightened about the respective guide rod 136 by a nut and bolt arrangement 150 which is conventional. In this manner, the position of tool support 128 along cantilvered I-beam 110 can be fixed.

As will be described in greater detail hereinafter, a tool, such as a saw or router, is effectively connected to tool support 128. Therefore, as thus far described, such tool is rotatably movable by means of the rotatable connection of I-beam 110 to column 14, and is radially movable with respect to curved wooden member 12 by means of the radially movable tool support 128, thereby providing movement with two degrees of freedom. Movement with a third degree of freedon in the vertical direction will be described hereinafter.

Figure 12A:
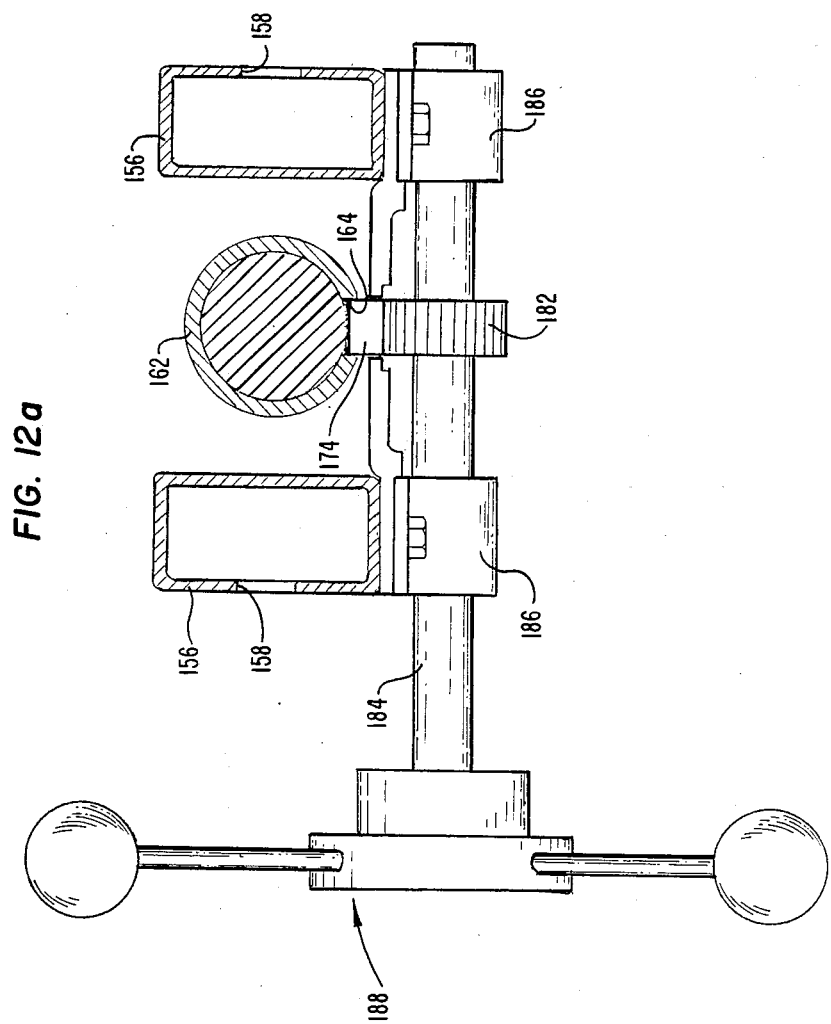
FIG. 12a is a cross-sectional view of the tool support of FIG. 12, taken along line 12a—12a of FIG. 12, without the counter weight assembly in position on the tool support.

As shown in FIGS. 12-14, tool support 128 includes a lower platform base 154 spaced below and substantially parallel with upper platform base 130, and two spaced apart vertically oriented columns 156 interconnecting platform bases 130 and 154. In a preferred embodiment, columns 156 are hollow and are formed with a rectangular cross-sectional configuration. Elongated slots 158 extend substantially along the entire length of the outwardly facing sides of columns 156.

In addition, lower platform base 154 is formed with an aperture 160, and a vertically oriented guide tube 162 is connected at one end to the underside of upper platform base 130 and extends through aperture 160. As shown in FIG. 12, guide tube 162 is formed with an elongated slot 164 extending therealong and facing radially inwardly toward column 14.

Lastly, tool support 128 includes a push/pull bar 166 connected to the radially outward sides of columns 156 by means of connecting bars 168. In this manner, the operator can grasp push/pull bar 166 for moving tool support 128 in the radial direction along cantilvered I-beam 110. As will now be described in detail, a tool holder 170 is mounted to tool support 128 for movement in the vertical direction so as to provide movement for the tool with three degrees of freedom.

Specifically, tool holder 170 includes a tube 172 telescopically received within guide tube 162. A vertically oriented rack 174 having a plurality of teeth 176 is secured to tube 172, and extends through and is guided by slot 164 in guide tube 162 for longitudinal movement therein. A locking collar 178 is provided at the lower end of guide tube 162 for fixedly locking tube 172 at a desired position within guide tube 162, although such locking collar 178 merely provides an additional safeguard and is not essential with the present invention.

An assembly 180 for vertically moving tube 172 within guide tube 162 includes a pinion gear 182 fixedly secured on a shaft 184, in meshing engagement with the teeth 176 of rack 174. Shaft 184 is rotatably journalled within a pair of brackets 186 secured to the radially inward sides of columns 156. An actuation wheel 188 is connected to one end of shaft 184 for rotating pinion gear 182, to thereby move rack 174, and thereby tube 172, in the vertical direction.

In order to provide a balancing of tube 172, such that rack 174 does not automatically assume its lowest position by virtue of the weight of the assembly, a balancing is achieved by a set of weights 190 which are connected to tube 172 in counter-balancing relation. As shown in FIG. 14, each weight 190 has a central, reduced dimension section 190a which slides within elongated slots 158 of columns 156. In this manner, each weight 190 is connected to a column 156 with an inner section 190b disposed within the respective column 156 and an outer section 190c disposed outside of the column 156. A pair of pulleys 192 are secured just below upper platform base 130 between guide tube 162 and a respective column 156, and a cord 194 is wrapped about each pulley and is connected at one end to tube 172 and at its opposite end to inner section 190b of a respective weight 190. With this arrangement, weights 190 provide a balancing of tube 172, and thereby of rack 174. The balancing nature of weights 190 is only overcome by turning of actuation wheel 188, whereby pinion gear 182, in meshing engagement with rack 174, causes the latter to move in the vertical direction against the force of weights 190.

In order to measure the vertical position of tube 172 and rack 174, a pointer 196 is secured to the radially outward side of one column 156, and points to a scale 198 on the radially outward side of outer section 190c of the respective weight 190, as shown in FIG. 13.

As shown in FIGS. 15 and 16, tool holder 170 includes a T-connector 200 releasably connected to tube 172. Specifically, T-connector 200 includes a hollow tool holding tube 202 and a hollow connector tube 204 centrally connected thereto in perpendicular relation. Hollow connector tube 204 slidably receives tube 172. In order to lock tube 172 to hollow connector tube 204, tube 172 is provided with a plurality of annularly spaced notches 206 at its lower end, and connector tube 204 includes an aperture 208. A housing 210 is secured to the exterior of connector tube 204 in surrounding relation to aperture 208. Specifically, housing 210 is provided with a hollow cylinder 212 having a central cavity 214 in axial alignment with aperture 208. An end cap 216 is screw-threadedly secured to the free end of cylinder 212 and includes a central aperture 218 therein. A plunger 220 is inserted through central bore 218, central cavity 214 and aperture 208 into a notch 206 for locking tube 172 to connector tube 204. Plunger 220 includes an enlarged head 222 positioned within central cavity 214, and a coil spring 224, also positioned within cavity 214, between enlarged head 222 and end cap 216, for normally biasing plunger 220 into a notch 206. The opposite end of plunger 220 includes a knob 226.

With this arrangement, coil spring 224 normally biases plunger 220 into annular groove 206. To remove T-connector 200 from tube 172, knob 226 is pulled outwardly, thereby pulling plunger 220 out from the respective notch 206, whereby tube 172 can be rotated with respect to connector tube 204.

In accordance with the present invention, a bolt 228 extends through hollow tool tube holding tube 202 and is screw-threadedly engaged with the lower end of tube 172, as shown in FIG. 16. In this manner, tube 172 is fixed as to vertical movement with respect to connector tube 204. However, bolt 228 permits rotation of tube 172 with respect to connector tube 204, except when plunger 220 is positioned within a retaining notch 206.

A tool holding rod 230 is positioned on each side and through tool holding tube 202. Specifically, the end of each tool holding rod 230 which is fitted within tool holding tube 202 is provided with an anchor 232, with a coil spring 234 being connected at one end to anchor 232. The opposite end of coil spring 234 is secured about bolt 228, whereby coil spring 234 normally applies an inwardly directed force to pull and retain rods 230 in tool holding tube 202.

In order to tighten tool holding tube 202 about rod 230, longitudinal notches 236 are cut at opposite ends of tool holding tube 202. A pair of flanges 238 are provided on opposite sides of each notch 236 and include screw-threaded apertures 240. In this manner, a bolt 242 is screw-threadedly received within each pair of flanges 238 to pull the same together and thereby bring the sides of each notch 236 together so as to tighten tool holding tube 202 about each rod 230.

In order to set the rotational position of each rod 230, a positioning collar 244 is mounted at the opposite free ends of tool holding tube 202 and includes at least one notch 246. A pin 248 is mounted on each rod 230 and is engaged within a respective notch 246 when the rods 230 are positioned within tool holding tube 202, so as to rotatably fix each rod 230 with respect to tool holding tube 202. Preferably, there are two recesses 246, such that rods 230 can be disposed at 90° with respect to each other.

Each rod 230 is also provided with a tool mounting platform 250 having a plurality of screw-threaded apertures 252 by which a tool, such as a saw 254 (FIG. 1) can be mounted. In this manner, two saws can be disposed at 90° with respect to each other, as shown in FIG. 1, such that one saw blade is disposed in a vertical plane and one saw blade is disposed in a horizontal plane. Suitable electric wiring (not shown) is also provided for supplying current to the motors of saws 254.

Figure 18:
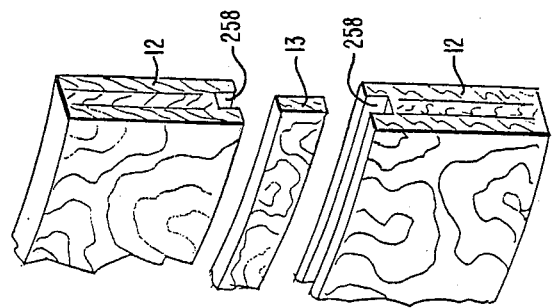
FIG. 18 is a perspective view, showing two curved wooden members being joined by a connecting strip which is glued into associated grooves for forming a joint between the two curved wooden members.
Figure 17:
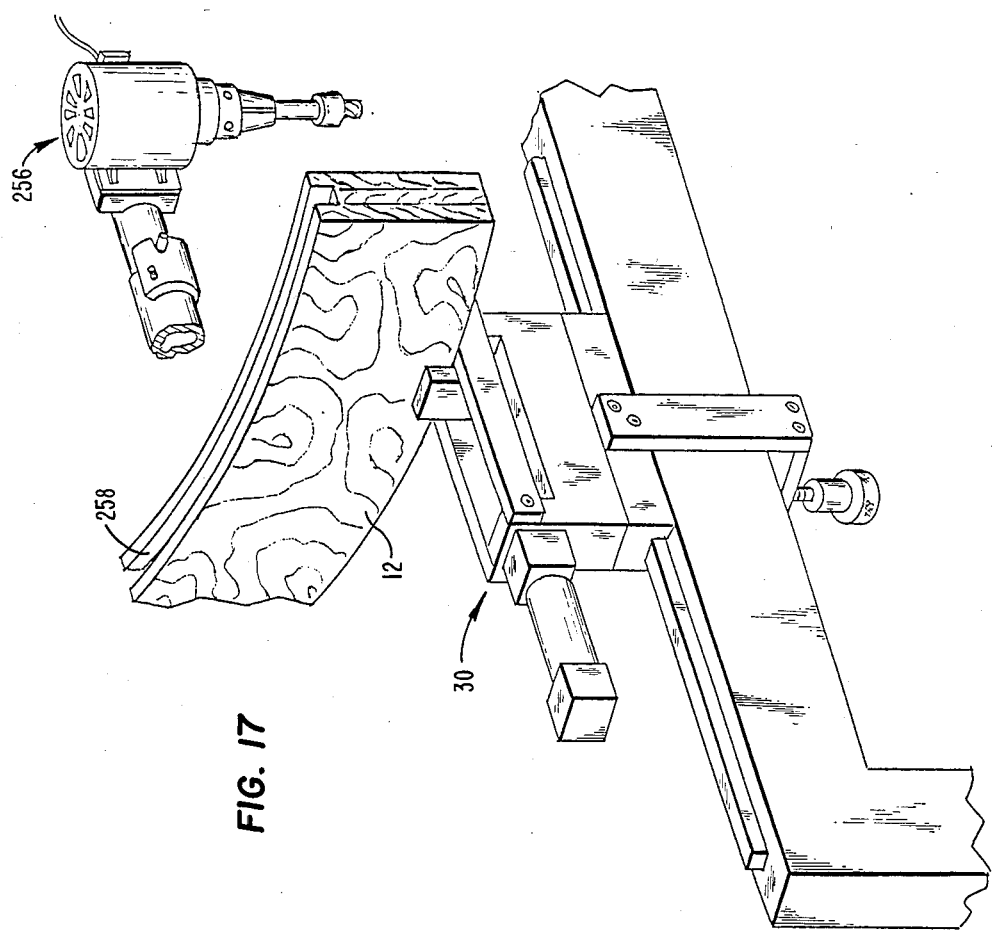
FIG. 17 is a perspective view, showing a fragment of the upper support member of one support guide with the adjustable clamping assembly holding a curved member in assembled position and showing a groove cut in one end by a routing attachment.

In some instances, it is desirable to attach a router 256 to a rod 230, as shown in FIG. 17. In such instance, the router blade can be used for milling a recess 258 along the upper surface of a curved wooden member 12, as shown. In this manner, two curved wooden members 12 can be secured to each other by a connecting strip 13, as shown in FIG. 18, disposed within the recesses 258 of each curved wooden member 12 to connect the two together.

It will be appreciated that the present invention provides a novel arrangement which makes it relatively easy to cut and/or mill a curved wooden member.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope or spirit of the invention as defined in the appended claims.

What is claimed is:

1. A machine for precision cutting and finishing of curved wooden members, comprising:
   a. a generally vertically disposed column,
   b. a support assembly including a plurality of spaced, relatively narrow support guides, each connected at one end to the column and disposed to extend therefrom in predetermined radial planes generally perpendicular to the column,
   c. said plurality of support guides each having an upper support member disposed at a predetermined working height for mounting a curved wooden member thereon,
   d. a radially adjustable clamping assembly on each of at least two support guides, each clamping assembly having two locking jaws, at least one locking jaw being fluidly operated to move relative to the other locking jaw between an open and a closed position for holding and fixing the curved wooden member on each of the upper support members of the plurality of support guides,
   e. an elongated beam rotatably connected at one end to the upper end of the column and cantilevered to extend radially outward therefrom for movement in a circumferential arc over the upper support members,
   f. a tool support having one end slidably connected to the elongated cantilevered beam and movable to and fro along the radially extending axis of the beam,
   g. a tool holder adjustably connected on said tool support for generally vertical movement along a vertical axis transverse to the radially extending axis of the elongated beam and rotational movement with respect to the vertical axis, and
   h. said tool holder including at least two tool connecting ends and at least two tool holding assemblies removably secured at respective ones of said connecting ends, each tool holding assembly including mounting means for mounting a cutting and/or finishing tool, with a cutting saw attachment having a cutting blade mounted on at least one of said tool holding assemblies, whereby on movement of the tool holder, the saw blade can be positioned to make a finished cut along one exposed end of the curved wooden member in assembled position on the upper support members.

2. A machine according to claim 1; wherein said tool holder includes a T-connector having a hollow tool holding tube and a hollow connector tube connected to said tool holding tube substantially centrally thereof, said tool holding tube including two tool connecting ends; said tool holding assemblies each including a tool holding rod telescopically received within a receptive tool connecting end of said tool holding tube, each tool holding rod including a tool mounting platform for carrying a cutting and/or finishing tool thereon; and means for normally biasing said tool holding rods into said tool holding tube.

3. A machine according to claim 2; wherein said tube holder further includes an intermediate tube connected with said connector tube and positioned coaxially therewith, and securing means extending through said tool holding tube into engagement with said connector tube for preventing movement of said intermediate tool with respect to said connector tube in the axial direction thereof; and wherein said means for biasing includes a spring connected between each tool holding rod and said securing means for normally biasing the respective tool holding rod into said tool holding tube.

4. A machine according to claim 3; wherein said securing means includes a bolt extending through said tool holding tube and threadedly connected to said intermediate tube.

5. A machine according to claim 2; wherein said tool holder further includes orienting means for rotatably orienting each tool holding rod at one of a plurality of angularly rotated positions.

6. A machine according to claim 5; wherein said orienting means includes a collar secured to each tool connecting end of said tool holding tube, said collar including a plurality of notches angularly displaced from each other, and said orienting means further includes a pin extending radially from each tool holding rod for engagement with one of said notches so as to rotatably orient the tool holding rod, and thereby the tool secured thereon, at a desired angular position.

7. A machine according to claim 3; wherein said intermediate tube includes a plurality of notches circumferentially spaced therearound, and said tool holder further includes plunger means secured to said connector tube for engaging in one of said notches to rotatably lock said intermediate tube to said connector tube.

8. A machine according to claim 1; wherein:
 a. each of said clamping assemblies includes a pneumatic cylinder for operatively moving said at least one locking jaw relative to the other locking jaw,
 b. means connected to each said pneumatic cylinder for delivering operating air thereto, and
 c. control means for controlling the flow of air to opposite ends of said pneumatic cylinder to actuate said at least one locking jaw between said open and closed positions.

9. A machine according to claim 1; wherein:
 a. said tool support includes a yoke assembly at the upper end thereof, and roller means on said yoke assembly,
 b. said roller means rides on the elongated cantilevered beam for rolling movement along the radially extending axis thereof,
 c. guide means connected to the elongated cantilevered beam, and
 d. at least one sleeve on said yoke assembly mounted about the guide means on the elongated cantilevered beam to prevent sidewise movement of the tool support with respect to the elongated cantilevered beam during movement of the tool support therealong.

10. A machine according to claim 1; further including:
 a. latch means rotatable with said elongated cantilevered beam, and
 b. locking means on said column and engageable by said latch means for rotatably locking the cantilevered beam in a latched non-operating position.

11. A machine for precision cutting and finishing of curved wooden members, comprising:
 a. a generally vertically disposed column,
 b. a support assembly including a plurality of spaced, relatively narrow support guides, each connected at one end to the column and disposed to extend therefrom in predetermined radial planes generally perpendicular to the column,
 c. said plurality of support guides each having an upper support member disposed at a predetermined working height for mounting a curved wooden member thereon,
 d. a radially adjustable clamping assembly on each of at least two support guides, each clamping assembly having two locking jaws, at least one locking jaw being fluidly operated to move relative to the other locking jaw between an open and a closed position for holding and fixing the curved wooden member on each of the upper support members of the plurality of support guides,
 e. an elongated beam rotatably connected at one end to the upper end of the column and cantilevered to extend radially outward therefrom for movement in a circumferential arc over the upper support members,
 f. a tool support having one end slidably connected to the elongated cantilevered beam and movable to and fro along the radially extending axis of the beam,
 g. a tool holder adjustably connected on said tool support for generally vertical movement along a vertical axis transverse to the radially extending axis of the elongated beam and rotational movement with respect to the vertical axis,
 h. said tool holder having at least two tool connecting ends thereon, and a cutting saw attachment with a cutting blade connected therein, and a cutting saw attachment with a cutting blade connected therein on at least one of said tool connecting ends, whereby on movement of the tool holder, the saw blade can be positioned to make a finished cut along one exposed end of the curved wooden member in assembled position on the upper support member,
 i. moving means for moving the tool holder along said vertical axis, and
 j. counterbalance means connected to said moving means for counterbalancing the weight of said tool holder and any tools mounted thereon, so as to maintain said tool holder at any desired position with respect to said tool support.

12. A machine according to claim 11; wherein said moving means includes a rack having gear teeth positioned on one of said tool holder and said tool support, and a gear having teeth in meshing engagement with the teeth of said rack on the other of said tool holder and tool support, and means for rotating said gear so as to move said tool holder along said vertical axis with respect to said tool support.

13. A machine according to claim 12; wherein said counterbalance means includes a pulley system secured to an upper end of said tool support and at least one counterbalancing weight secured to said tool holder through said pulley system in counterbalancing relation to said tool holder and any tool carried thereby.

14. A machine according to claim 13; wherein said tool support includes a hollow tube having an elongated slot therein extending in the direction of said vertical axis and said tool holder includes an intermediate tube telescopically received in said tube with said rack secured thereto and extending through said elongated slot, and said gear is secured on a shaft rotatably journalled to said tool support; and said pulley system includes at least one pulley secured at said upper end of said tool support, with said counterbalancing weight secured about the at least one pulley by means of a cord to maintain the tool holder at any desired position with respect to the tool support.

15. A machine according to claim 11; wherein:
   a. each of said clamping assemblies includes a pneumatic cylinder for operatively moving said at least one locking jaw relative to the other locking jaw,
   b. means connected to each said pneumatic cylinder for delivering operating air thereto, and
   c. control means for controlling the flow of air to opposite ends of said pneumatic cylinder to actuate said at least one locking jaw between said open and closed positions.

16. A machine according to claim 11; wherein:
   a. said tool support includes a yoke assembly at the upper end thereof, and roller means on said yoke assembly,
   b. said roller means rides on the elongated cantilevered beam for rolling movement along the radially extending axis thereof,
   c. guide means connected to the elongated cantilevered beam, and
   d. at least one sleeve on said yoke assembly mounted about the guide means on the elongated cantilevered beam to prevent sidewise movement of the tool support with respect to the elongated cantilevered beam during movement of the tool support therealong.

17. A machine according to claim 11; further including:
   a. latch means rotatable with said elongated cantilevered beam, and
   b. locking means on said column and engageable by said latch means for rotatably locking the cantilevered beam in a latched non-operating position.

18. A machine for precision cutting and finishing of curved wooden members, comprising:
   a. a generally vertically disposed column,
   b. a support assembly including a plurality of spaced, relatively narrow support guides, each connected at one end to the column and disposed to extend therefrom in predetermined radial planes generally perpendicular to the column,
   c. said plurality of support guides each having an upper support member disposed at a predetermined working height for mounting a curved wooden member thereon,
   d. a radially adjustable clamping assembly on each of at least two support guides, each clamping assembly having two locking jaws, at least one locking jaw being fluidly operated to move relative to the other locking jaw between an open and a closed position for holding and fixing the curved wooden member on each of the upper support members of the plurality of support guides,
   e. an elongated beam rotatably connected at one end to the upper end of the column and cantilevered to extend radially outward therefrom for movement in a circumferential arc over the upper support members,
   f. a tool support having one end slidably connected to the elongated cantilevered beam and movable to and fro along the radially extending axis of the beam,
   g. a tool holder adjustably connected on said tool support for generally vertical movement along a vertical axis transverse to the radially extending axis of the elongated beam and rotational movement with respect to the vertical axis, and
   h. said tool holder including at least two tool connecting ends and at least two holding assemblies removably secured at respective ones of said connecting ends, each tool holding assembly including mounting means for mounting a cutting and/or finishing tool thereon, with a cutting saw attachment having a cutting blade mounted on at least one of said tool holding assemblies, whereby on movement of the tool holder, the saw blade can be positioned to make a finished cut along one exposed end of the curved wooden member in assembled position on the upper support members;
   i. moving means for moving the tool holder along said vertical axis, and
   j. counterbalance means connected to said moving means for counterbalancing the weight of said tool holder and any tools mounted thereon, so as to maintain said tool holder at any desired position with respect to said tool support.

* * * * *